Dec. 23, 1969   F. A. ADCOCK   3,485,113
PEDALS
Filed July 6, 1967

Frederick A. Adcock,
INVENTOR:

BY Bierman & Bierman,
ATTORNEYS.

United States Patent Office 3,485,113
Patented Dec. 23, 1969

3,485,113
PEDALS
Frederick A. Adcock, Wollaton, England, assignor to Raleigh Industries Limited, a British company
Filed July 6, 1967, Ser. No. 651,508
Claims priority, application Great Britain, July 19, 1966, 32,293/66
Int. Cl. G05g 1/14
U.S. Cl. 74—594.4                3 Claims

ABSTRACT OF THE DISCLOSURE

A cycle pedal comprising a pedal block having a bore longitudinally thereof, a pedal frame about the said block and supportably engaging same, bearing bushes at opposed positions on the frame and aligned with the bore, and a pedal spindle extending through the bore upon which the block and frame are rotatably supported via the said bushes.

---

The invention concerns pedals and has more particular reference to pedals for application to bicycles, tricycles and like structures.

The primary object of the persent invention is to provide an inexpensive yet effective pedal structure.

According to the present invention a pedal structure comprises a pedal frame of generally rectangular shape, aligned bearing bushes respectively located centrally of two opposite sides of the said frame and extending inwardly of such frame, a pedal spindle extending between the bushes and upon which the frame is rotatably mounted, and a pedal block structure disposed within the frame, the said pedal block structure having a through hole therein to receive the pedal spindle and being adapted, at those sides thereof parallel to the axis of the said hole, to engage the frame to be supported thereby.

Preferably the pedal block structure and the frame are respectively single elements.

The invention will now be described further, by way of example only, with reference to the accompanying drawings illustrating two embodiments thereof and in which.

Figure 1:
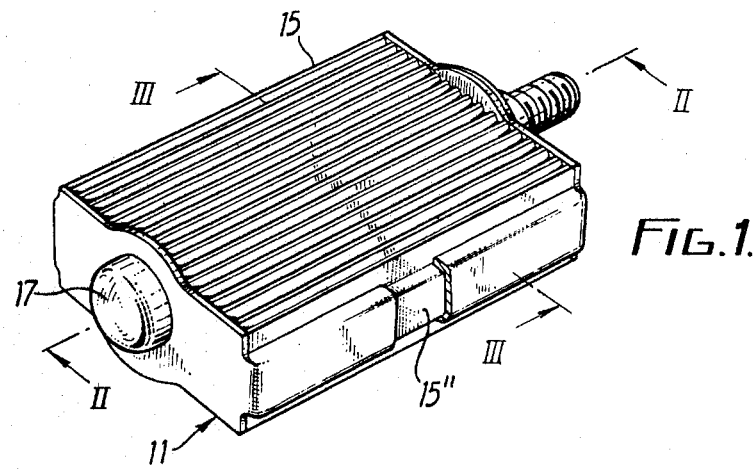
FIG. 1 is a perspective view of a first embodiment.
Figure 2:
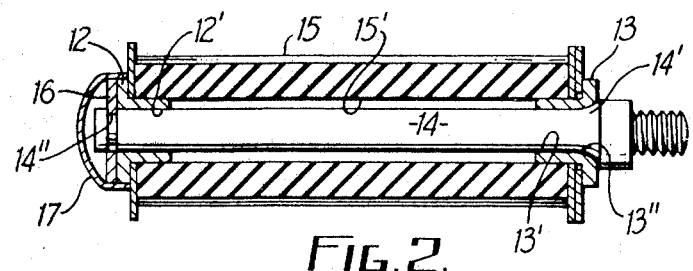
FIG. 2 is a section taken longitudinally of the pedal of FIG. 1.

Referring now to the drawings, a bicycle pedal comprises a rectangular pedal frame 11, bearing bushes 12, 13 located one centrally of each of the two shorter sides of such frame, a pedal spindle 14 extending longitudinally of the frame 11 and engaging the said bearing bushes 12, 13 and a pedal block 15 positioned within the frame and supported thereby.

Figure 3:
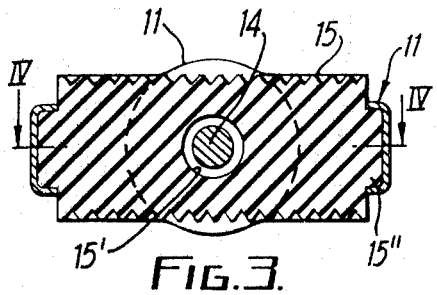
FIG. 3 is a sectional taken transversely of the pedal of FIG. 1.
Figure 4:
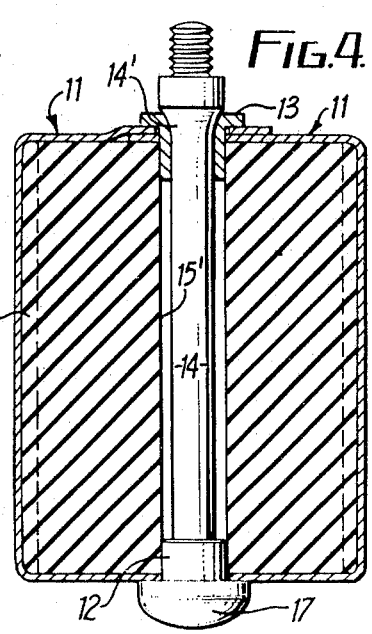
FIG. 4 is a section on line IV—IV of FIG. 3.

The pedal frame 11, see particularly FIGS. 3 and 4 is a one piece element having side portions of inwardly facing channel section and apertured end regions to receive the bushes, one such end region being constituted by the overlapped extremities of a blank from which the frame is constructed.

The bushes are a press fit in the apertures in the frame and are produced by a sintering process, such bushes 12, 13 having a cylindrical bore 12', 13' thereto, such bore defining a plain bearing upon which the pedal rotates relative to the spindle 14.

The pedal spindle is of a conventional form and is axially located relative to the frame by engagement between a part flared surface 13" at the outer face of one bush and a complementary flare 14' on the spindle, and by an eccentric lock washer 16 located in a peripheral groove 14" at the outer extremity of the spindle, such washer being maintained in central position around a spindle by a dust cap 17 crimped onto the outer end of the bush 12.

The pedal block 15 is a one-piece structure and has a through hole 15' longitudinally thereof, the longer sides of the block each having an outwardly extending rib 15" to engage the channel section side portions of the frame thereby to ensure support of the block relative to the frame.

To assemble the pedal the outermost bush 12 is located in the aperture in the outer end of the frame 11, the frame having previously been generally formed into its rectangular shape but being somewhat open at its inner end and the block 15 is positioned within the frame by the engagement of one end of such block on the bush and the alignment of the ribs with the respective channel section portions.

The frame is now closed upon the block and the second bush 13 is introduced into the aligned apertures in the inner end of the frame.

Finally, the structure as so far assembled is applied to a pedal spindle 14 and is secured to such spindle by the positioning of the lock washer 16 and dust cap 17.

Figure 5:
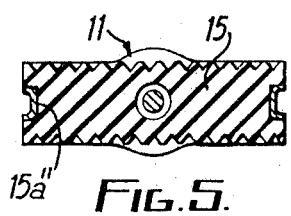
FIG. 5 is a view corresponding to FIG. 3 of an alternative pedal.

As an alternative to forming the frame with inwardly facing channel section side regions and providing complementary ribs on the pedal block, the block can be recessed along its longitudinal sides as at 15a" in FIG. 5 and the frame be correspondingly formed.

I claim:

1. A pedal structure comprising a pedal frame of generally rectangular shape, aligned bearing bushes respectively located centrally of two opposite sides of the said ˙rame and extending inwardly of such frame, a pedal spindle extending between the bushes and upon which the frame is rotatably mounted, and a pedal block structure entirely bounded by the frame, the said pedal block structure having a through hole therein to receive the pedal spindle and being adapted, at those sides thereof parallel to the axis of the said hole, to engage the frame to be supported thereby, and wherein each of the outer longitudinal sides of said pedal block structure presents an outwardly directed rib and the corresponding parts of the frame are provided with complementary formations for engagement therewith.

2. A pedal structure as claimed in claim 1 wherein each of the outer longitudinal sides of pedal block structure presents an outwardly directed rib and the corresponding parts of the frame are provided with complementary formations for engagement therewith.

3

3. A pedal structure as claimed in claim 1, wherein the said complementary formation comprises a channel sectioned portion to the frame.

References Cited

UNITED STATES PATENTS

| D. 211,422 | 6/1968 | Adcock | D90—14 |
| 473,030 | 4/1892 | Sweetland | 74—594.4 |
| 601,517 | 3/1898 | Lavigne | 74—594.4 |
| 1,974,247 | 9/1934 | Musselman | 74—594.4 |
| 2,897,687 | 8/1959 | Douglas et al. | 74—594.4 |
| 2,899,842 | 8/1959 | Krokos et al. | 74—594.4 |
| 2,298,283 | 10/1942 | Duffy | 74—594.4 |

4

FOREIGN PATENTS 173,941　1/1922　Great Britain.

OTHER REFERENCES

American Bicyclist & Motorcyclist, April 1960, D 90–14, p. 70.

FRED C. MATTERN, Jr., Primary Examiner

C. F. GREEN, Assistant Examiner

U.S. Cl. X.R.

90—14